XR 3,947,688

United States Patent [19]
Massey

[11] 3,947,688
[45] Mar. 30, 1976

[54] METHOD OF GENERATING TUNABLE COHERENT ULTRAVIOLET LIGHT AT WAVELENGTHS BELOW 2500 A

[75] Inventor: Gail A. Massey, Cornelius, Oreg.

[73] Assignee: Oregon Graduate Center for Study and Research, Beaverton, Oreg.

[22] Filed: Aug. 26, 1974

[21] Appl. No.: 500,651

[52] U.S. Cl. .............. 250/495; 250/474; 250/504; 331/94.5 N
[51] Int. Cl.² .......................................... H01S 3/00
[58] Field of Search .......... 250/493, 494, 495, 504; 331/94.51, 94.5 N

[56] References Cited
UNITED STATES PATENTS
3,665,338  5/1972  Harris et al. .................. 331/94.5 N
3,750,670  8/1973  Palanos et al. ................ 331/DIG. 1

OTHER PUBLICATIONS
"Review of U. V. Laser Physics" Rhodes IEEE Journal of Quantum Electronics, Feb. 1974, Vol. 10, No. 2, pp. 168–169.
"Tunability: More Lines at High Power are Available at Narrower Resonances" – Harris LF Aug. 1973, pp. 38, 40, 42.

*Primary Examiner*—Alfred A. Smith
*Assistant Examiner*—B. C. Anderson
*Attorney, Agent, or Firm*—Kolisch, Hartwell, Dickinson & Stuart

[57] ABSTRACT

A method for obtaining efficient production of short-wavelength, continuously-tunable ultraviolet light by parametric mixing of optical frequency radiation in a nonlinear crystal. The method involves mixing the second harmonic of a tunable, visible-wavelength laser, an organic dye laser, for example, with the fixed-wavelength output of a near-infrared laser, e.g., a Nd:YAG laser, in a conventional nonlinear crystalline material such as ADP or KDP.

12 Claims, 4 Drawing Figures

METHOD OF GENERATING TUNABLE COHERENT ULTRAVIOLET LIGHT AT WAVELENGTHS BELOW 2500 A

BACKGROUND OF THE INVENTION

The present invention relates generally to the generation of coherent, short-wavelength ultraviolet radiation, and more particularly to a method for generating continuously-tunable UV radiation in the wavelength range 2000–2500 A.

In studies involving photon interaction processes, such as photoionization and photodissociation processes, there has evolved a need for high intensity sources of short-wavelength ultraviolet radiation. There is a particular need for high-intensity, wavelength-tunable sources in the spectral region below about 2500 A, and more especially below about 2300 A.

The development of wavelength-tunable dye lasers and parametric generators spanning the visible and near-infrared regions of the spectrum has made it possible to obtain continuously-tunable, coherent UV in the range from about 4000 A down to about 2300 A by direct frequency doubling in nonlinear crystals. Crystals of ammonium dihydrogen phosphate (ADP) are commonly used for such phase matched second harmonic generation because of the material's high conversion efficiency high transparency and resistance to optically induced damage. However, the shortest wavelength at which phase matching for second harmonic generation can be achieved with ADP is about 2442 A. Shorter wavelengths, down to about 2300 A, can been generated by direct frequency doubling in lithium formate monohydrate (LFM) crystals. LFM has a lower conversion efficiency than ADP, however, an efficiency of about 2 percent at fundamental powers in excess of 50 kW having been reported. Nonlinear crystals with sufficient transparency, damage resistance, and birefringence to allow direct second harmonic generation at wavelengths shorter than about 2300 A are not presently available.

Another approach to the generation of tunable, short-wavelength UV involves summing the fundamental and second harmonic of a fixed wavelength near-infrared laser with the output of a tunable, visible dye laser. Such third order, i.e., threephoton, interaction processes are very inefficient and yield unacceptably low outputs unless very high peak power primary lasers are used to irradiate the nonlinear mixing crystal.

SUMMARY OF THE INVENTION

The present invention provides an improved method for generating tunable, coherent ultraviolet radiation at wavelengths in the range of about 2000 to 2500 A. In general terms, the method comprises parametric mixing in a crystal having second order nonlinear polarisability of coherent, tunable-wavelength near-ultraviolet radiation with the fixed wavelength output of an infrared laser to obtain the desired short-wavelength UV. Nonlinear crystals of conventional, high-damage-resistant materials such as ADP or KDP (potassium dihydrogen phosphate) are used for mixing. According to a preferred embodiment of the invention, tunable coherent UV in the 2000–2350 A region is obtained by mixing the second harmonic of a tunable-wavelength visible dye laser with the 1064 nm output of a Nd:YAG laser in an ADP crystal.

BRIEF DESCRIPTION OF THE DRAWINGS

The invention will now be described in greater detail, with reference to the accompanying drawings, wherein.

DETAILED DESCRIPTION

Figure 1:
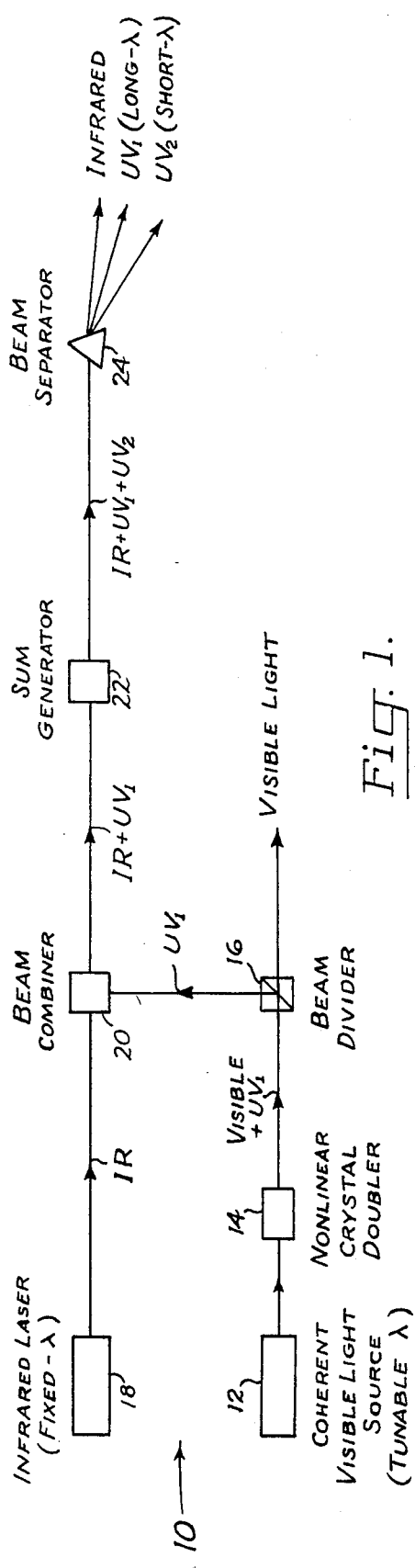
FIG. 1 illustrates in generalized, block diagram form an optical system according to the invention for generating tunable, coherent ultraviolet radiation.

In general terms, the present invention comprehends generating tunable, coherent, short-wavelength ultraviolet radiation by mixing, or summing, a fixed-wavelength coherent infrared signal with longer wavelength UV which may be derived, for example, by frequency doubling the output of a coherent, wavelengthtunable source in the visible spectrum. Referring to the drawings, an optical system for generating tunable, coherent, short-wavelength UV by this method is indicated generally at 10 in FIG. 1. In system 10, coherent, visible light from a wavelength-tunable source 12, such as a parametric generator or an organic dye laser, is frequency doubled in a doubler 14 comprised of a nonlinear crystal such as ADP, KDP, or ADA (ammonium dihydrogen arsenate). The second harmonic, near-ultraviolet ($UV_1$) component of doubler 14's output is separated by a polarizer, or beam divider, 16, then combined with infrared (IR) radiation from a fixed-wavelength infrared laser 18, a Q-switched Nd crystalline laser, for example, by a suitable beam combiner 20. The collinear IR and $UV_1$ beams from combiner 20 are mixed in sum generator 22 by synchronous addition, or phase matching, in an ADP or KDP crystal to produce coherent, short-wavelength ultraviolet ($UV_2$). The $UV_2$ component of the output beam from sum generator 22 is then separated from the IR and $UV_1$ components by a beam separator, or prism, 24.

Figure 2:
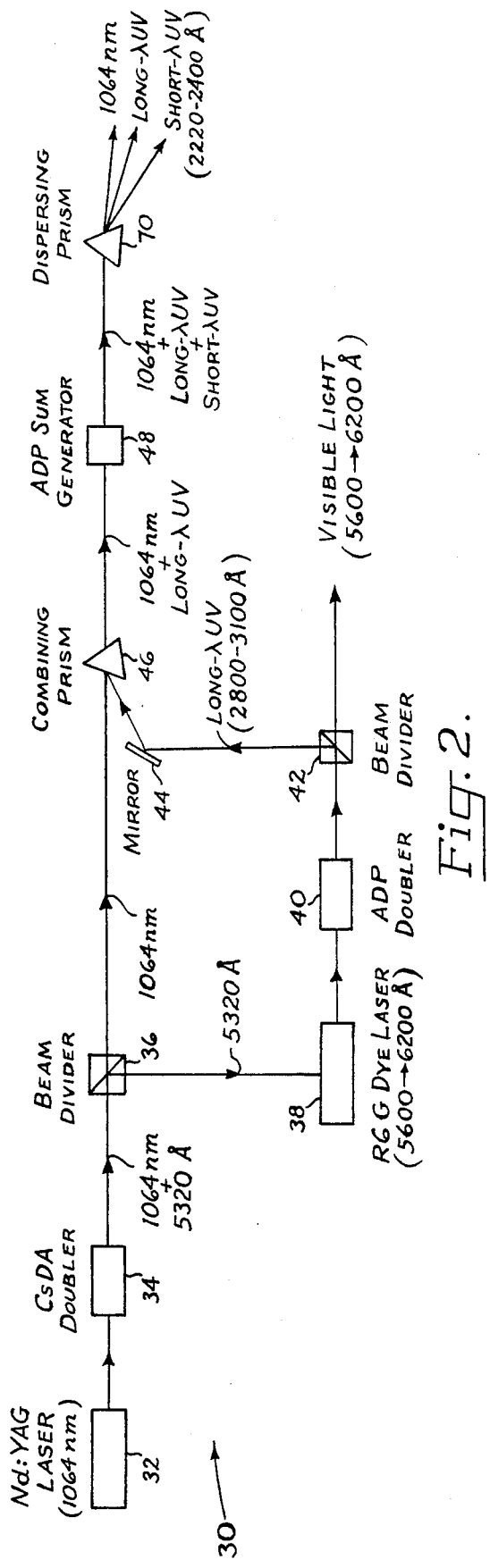
FIG. 2 illustrates an optical system for generating tunable, short-wavelength, coherent UV according to a preferred embodiment of the invention.

Further describing the method of the invention by reference to a specific embodiment of system 10, an optical system for generating tunable, coherent ultraviolet radiation throughout the range from about 2200 to 2400 A is indicated generally at 30 in FIG. 2. System 30 includes a flash-pumped, Q-switched Nd:YAG laser 32, and a CsDA (cesium dihydrogen arsenate) frequency doubler 34. The CsDA crystal comprising doubler 34 is mounted in an evacuated enclosure provided with a suitable heater and thermostatic controller, and is oriented so that the 1064 nm output of laser 32 is coupled into the crystal at 90° to its optical axis. Phase matching is achieved by temperature tuning the crystal. The second harmonic, 5320 A output from doubler 34 is separated from the 1064 nm fundamental by polarizing beam divider 36 and used for transversely pumping a rhodamine 6G (R6G) dye laser 38.

The output of laser 38, a beam of coherent, visible light tunable from about 5600 to 6200 A, is coupled into an ADP crystal comprising a frequency doubler 40. Doubler 40 is similar to doubler 34, the crystal being mounted in an evacuated chamber provided with a suitable heater and thermostatic controller, and oriented 90° to the irradiating beam. Phase matching for second harmonic generation is accomplished through temperature tuning of the ADP crystal. The second harmonic, 2800–3100 A ultraviolet output of doubler 40 is separated from the visible wavelength fundamental by polarizing beam divider 42, and collinearly combined with the 1064 nm beam from beam divider 36 through the use of mirror 44 and combining prism 46. The combined, collinear infrared and long-wavelength ultraviolet beams then are coupled into the ADP crystal comprising sum generator 48.

Figure 3:
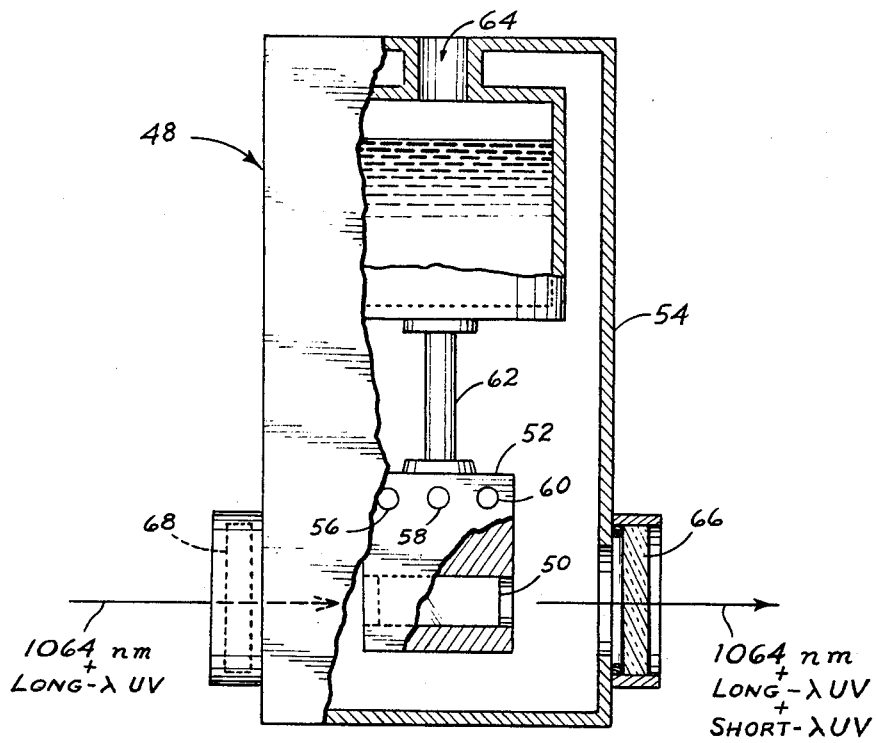
FIG. 3 is a simplified view, partially broken away and partially in section, of an optical frequency sum generator comprised of a nonlinear mixing crystal in a temperature-controlled holder.

Referring to FIG. 3, sum generator 48 includes an ADP crystal 50, suitably a 45° Z-cut crystal, mounted in a temperature-adjustable holder 52 within an evacuated dewar 54. Crystal holder 52 is provided with a heater 56, a temperature sensor 58 for controlling the heater, and a platinum thermometer 60 for measuring the temperature of the crystal. A metal post 62 connects crystal holder 52 to the underside of a chamber 64 holding a supply of liquid nitrogen. As will be understood, the metal post serves as a thermal connection between the low temperature (−195° C.) liquid nitrogen and the holder. Heater 56 is activated as needed to adjust the temperature of holder 52, and hence the temperature of crystal 50, to a desired higher value. Optical access to the ADP crystal is provided by a pair of fused silica windows 66, 68 aligned with the crystal. Means (not shown) also are provided for rotating the crystal with respect to the incoming, i.e., irradiating, beam.

Again referring to FIG. 2, the combined, collinear infrared and long-wavelength ultraviolet beams from prism 46 are directed into crystal 50 as ordinary rays, with the propagation at 90° to the crystal's optical axis. Either temperature or angle tuning of the ADP crystal is employed to achieve phase matching at the sum frequency, with the resultant short-wavelength ultraviolet radiation being generated as an extraordinary wave. The temperature required for 90° phase matching is plotted in FIG. 4. The output from sum generator 48 is separated into its components, 1064 nm IR, long wavelength UV in the 2800–3100 A range, and their sum, short wavelength UV in the range of about 2200–2400 A, by a fused silica dispersing prism 70.

Figure 4:
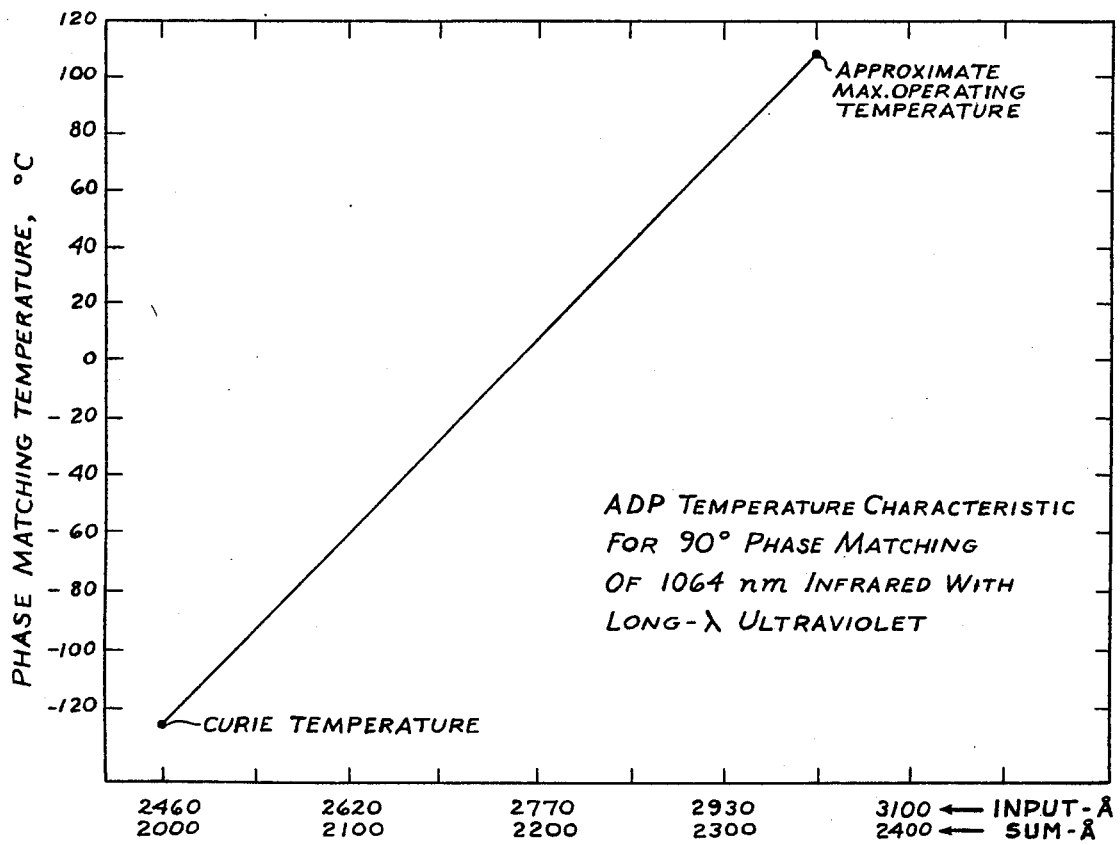
FIG. 4 is a plot of phase matching temperatures for summing 1064 nm and near-ultraviolet radiation in ADP to obtain UV in the 2000–2350 A range.

Tunable, coherent, ultraviolet can be generated in other portions of the 2000–2500 A spectral region with the just-described optical system by replacing R6G laser 38 with a dye laser having an output in a different portion of the visible spectrum. Parametric generators can also be used to provide the tunable visible light for frequency doubling into the near ultraviolet. As shown in FIG. 4, UV wavelengths as short as about 2000 A can be obtained by 90° phase matching of 1064 nm IR with appropriate longer-wavelength ultraviolet in ADP. The limits of the temperature tuning range (about 2000–2350 A) are set by the nonlinear crystal's Curie temperature (−125°C.), and maximum stable operating temperature (about 110°C.). For the generation of UV wavelengths longer than about 2350 A, phase matching is achieved by angle tuning. i.e., adjusting the angle of propagation of the fundamental beams relative to the crystal's optical axis. Infrared at wavelengths other than 1064 nm may be used in the method of the invention, wavelengths in the range of about 950 to about 1100 nm, for example, but it is advantageous to choose a value near the infrared absorption edge of the sum generating crystal material. The 1064 nm line of a Nd:YAG laser is particularly suitable for use with ADP since adequate power, narrow spectral linewidth, and a variety of pulse formats are available in neodynium lasers. If desired, a KDP crystal may be used for sum frequency generation, but the temperature tuning range is more limited. In addition, KDP has a greater short-wavelength UV transmission loss.

Compared with prior art methods of generating short-wavelength coherent ultraviolet radiation, the method of the invention provides greater improved conversion efficiency. For efficient upconversion of the dye laser's second harmonic, the spectral spread of its fundamental preferably should not exceed about 1 A, and for best efficiency should be of the order of about 0.25 A. The infrared power density $P_2$ required for efficient upconversion of a long-wavelength UV power density $P_1$ to a density $P_3$ at the sum frequency can be estimated using the relation $$\frac{P_3}{P_1} = \frac{52.2 \, d_{36}^2 \, L \, P_2}{n_{1o} \, n_{2o} \, n_{3e} \, \lambda_3^2}$$

where the nonlinear coefficient $d_{36}$ is $1.36 \times 10^{-9}$ esu, L is the crystal length in centimeters, $n_{1o}$ and $n_{2o}$ are the ordinary refractive indicies for the long-wavelength UV and IR, respectively $n_{3e}$ is the extraordinary index for the upconverted UV, $\lambda_3$ is the upconverted wavelength in centimeters, and the power densities are in watts per square centimeter. According to this equation, a 10 percent conversion efficiency in a one centimeter crystal requires an infrared power density near $2 \times 10^6$ watts per square centimeter. This level can be easily obtained from a Q-switched Nd:YAG laser without tight focusing.

EXAMPLE

According to the method of the invention, collinear infrared radiation at 1064 nm from a flash-pumped, Q-switched Nd:YAG laser and long-wavelength UV at 2660 A are brought to a focus with a 30 cm. focal length lens. A 2.5 centimeter, 45° Z-cut crystal of ADP, mounted in a thermostatically controlled holder constructed as shown in FIG. 3, is placed in the diverging beam a few centimeters beyond the focus of the lens. The collinear beams comprise pulses having a duration of about 10 nanoseconds and a pulse repetition rate of about 10 Hz. With an average incident power of 130 milliwatts at 1064 nm on the ADP crystal L greater than 50 percent average power conversion of the long-wavelength UV to 2128 A UV is obtained. The short-wavelength UV output is maintained at a level above 0.5 milliwatts for periods approaching 1 hour without apparent damage to the crystal. Peak output power under these conditions is in excess of 5000 watts.

Thus, there is provided an improved method for generating tunable, coherent, ultraviolet light at wavelengths in the range of about 2000–2500 A. Although a preferred embodiment of the method has been described herein, it will be understood that variations and modifications are possible without departing from the spirit of the invention.

It is claimed and desired to secure by letters patent:

1. The method of generating tunable, coherent optical radiation having a short wavelength ultraviolet component in the range of about 2000 to about 2500 A which comprises sum frequency phase matching in a crystal having second order nonlinear polarisability, coherent infrared radiation having a wavelength of about 1060 nm with coherent ultraviolet radiation consisting of the second harmonic of the coherent output from a wavelength-tunable source of visible-wavelength radiation.

2. The method of claim 1, wherein said crystal is of a material selected from the group consisting of ammonium dihydrogen phosphate and potassium dihydrogen phosphate.

3. The method of claim 1 wherein said wavelength-tunable source comprises an organic dye laser.

4. The method of claim 1 wherein said infrared radiation consists of 1064 nm radiation from a Nd:YAG laser.

5. The method of generating coherent optical radiation having a short wavelength ultraviolet component in the range of about 2000–2500 A which comprises
providing a wavelength-tunable source of coherent, visible-wavelength radiation,
frequency doubling the visible-wavelength radiation from said source to provide coherent, near-ultraviolet radiation,
providing coherent infrared radiation having a wavelength in the range of about 950–1100 nm, and
frequency summing said infrared radiation and near-ultraviolet radiation by phase matching in a crystalline material having second order nonlinear polarisability.

6. The method of claim 5 wherein said crystalline material is selected from the group consisting of ammonium dihydrogen phosphate and potassium dihydrogen phosphate.

7. The method of claim 5 wherein said infrared radiation has a wavelength of about 1064 nm and said infrared source comprises a Nd:YAG laser.

8. The method of claim 5 wherein said source of coherent, visible-wavelength radiation is an organic dye laser.

9. The method of generating tunable, coherent optical radiation having a short wavelength ultraviolet component in the range of about 2000–2350 A which comprises
providing a wavelength-tunable source of coherent, visible-wavelength radiation,
frequency doubling the visible-wavelength radiation from said source to provide coherent, near-ultraviolet radiation having a wavelength in the range of about 2500 to about 3100 A,
providing coherent infrared radiation at a wavelength of about 1064 nm, and
frequency summing said infrared radiation and near-ultraviolet radiation by phase matching in an ammonium dihydrogen phosphate crystal.

10. The method of generating tunable, coherent optical radiation of a short wavelength ultraviolet component in the range of about 2000 to about 2500 A which comprises
providing a fixed wavelength source of coherent infrared radiation,
providing a wavelength-tunable source of coherent, near-ultraviolet radiation, and
frequency summing radiation from said infrared source and radiation from said near-ultraviolet source in a crystalline material having second order nonlinear polarisability to provide coherent optical radiation within said range.

11. The method of claim 10, wherein the radiation from said infrared source has a wavelength of about 1060 nm, and the radiation from said near-ultraviolet source has a wavelength in the range of about 2500 to about 3100 A.

12. The method of claim 11, wherein said crystalline material is selected from the group consisting of ammonium dihydrogen phosphate and potassium dihydrogen phosphate.

* * * * *